United States Patent
Sato (10) Patent No.: US 7,154,404 B2
(45) Date of Patent: Dec. 26, 2006

(54) ELECTRIC POWER STEERING SYSTEM HAVING FAILURE DETECTION APPARATUS

(75) Inventor: Atsushi Sato, Toyota (JP)

(73) Assignee: Denso Corporation, Kariya (JP)

( * ) Notice: Subject to any disclaimer, the term of this patent is extended or adjusted under 35 U.S.C. 154(b) by 182 days.

(21) Appl. No.: 11/019,284

(22) Filed: Dec. 23, 2004

(65) Prior Publication Data
US 2005/0174083 A1 Aug. 11, 2005

(30) Foreign Application Priority Data
Feb. 3, 2004 (JP) ............... 2004-026910

(51) Int. Cl.
*G08B 21/00* (2006.01)
(52) U.S. Cl. .............. 340/648; 340/517; 340/664; 180/402; 318/432; 318/254
(58) Field of Classification Search ........... 340/648, 340/653, 657, 664, 506, 507, 517; 180/400, 180/402, 6.5; 318/432, 254, 565, 648
See application file for complete search history.

(56) References Cited
U.S. PATENT DOCUMENTS

| | | | |
|---|---|---|---|
| 5,552,684 A * | 9/1996 | Wada et al. ............. 318/293 |
| 5,691,611 A * | 11/1997 | Kojima et al. ........... 318/254 |
| 6,191,550 B1 * | 2/2001 | Yoshihara ............... 318/661 |
| 6,373,217 B1 | 4/2002 | Kawada et al. |
| 6,513,619 B1 | 2/2003 | Amakusa et al. |
| 6,577,957 B1 * | 6/2003 | Fujimoto et al. .......... 702/36 |
| 6,644,433 B1 * | 11/2003 | Sato .................... 180/446 |
| 6,655,709 B1 * | 12/2003 | Sherwin et al. .......... 280/402 |
| 7,007,769 B1 * | 3/2006 | Hara et al. .............. 180/402 |
| 2003/0151383 A1 | 8/2003 | Hayashi |

* cited by examiner

*Primary Examiner*—Toan N. Pham
(74) *Attorney, Agent, or Firm*—Posz Law Group, PLC (57) ABSTRACT

An electric power steering system comprises a three-phase brushless DC motor, a steering torque detector, a resolver for detecting a resolver rotation angle of the three-phase brushless DC motor, a processing unit and a failure detection apparatus. The processing unit supplies a motor rotation angle and a rotational direction command value to the failure detection apparatus. The failure detection apparatus determines whether the processing unit is normal based on the motor rotation angle and the rotational direction command value.

6 Claims, 9 Drawing Sheets

ELECTRIC POWER STEERING SYSTEM HAVING FAILURE DETECTION APPARATUS

CROSS REFERENCE TO RELATED APPLICATION

This application is based on and incorporates herein by reference Japanese Patent Application No. 2004-26910 filed on Feb. 3, 2004.

FIELD OF THE INVENTION

The present invention relates to an electric power steering system. More particularly, the present invention relates to a failure determination apparatus of an electric power steering system using a three-phase brushless DC motor.

BACKGROUND OF THE INVENTION

In an electric power steering system for applying a proper steering assist force to reduce the steering force of the driver, a three-phase brushless DC motor is used in more cases in place of the conventional motors with brushes. A three-phase brushless DC motor is employed for reasons such as a simple mechanical structure and excellent controllability.

A control apparatus for a brushless motor is required to have a function of detecting a failure occurring in a CPU included in the control apparatus. In accordance with a method disclosed in U.S. Pat. No. 6,373,217 (JP2001-018819A), a sub-CPU is used to control a main CPU for controlling the brushless motor.

In another method disclosed in U.S. Pat. No. 6,513,619 (JP 2002-67985A), no sub-CPU is used to monitor a failure of a CPU for controlling a DC motor. With this method, however, the direction of the rotation of the motor needs to be detected. In order to solve this problem, a circuit for determining the drive direction of the motor has been proposed. As described in US 2003-0151383A1 (JP2003-235285A), a drive-direction determination circuit determines the drive direction of the brushless motor based on an electric angle of the motor. In turn, the electric angle of the brushless motor is found based on a signal output by a resolver using a region determination circuit.

Figures 10A, 10B:
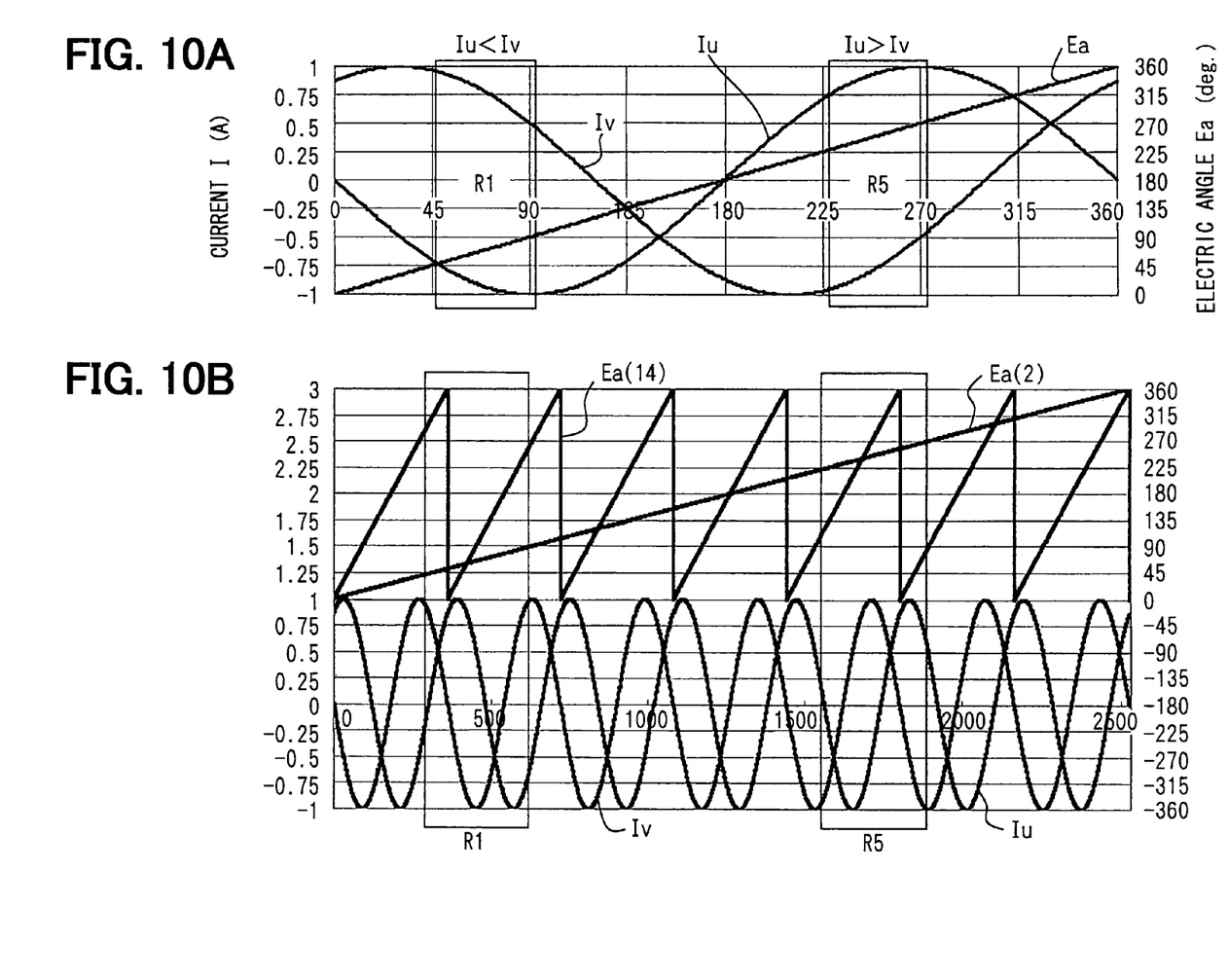
FIGS. 10A and 10B are diagrams showing relations between electric angles and phase currents in the conventional system.

In U.S. Pat. No. 6,373,217, a control system needs to be constructed with a plurality of CPUs, requiring a complicated configuration of a circuit composing the control system and a large size of a control apparatus accommodating the circuit. In addition, as a premise, the methods disclosed in U.S. Pat. No. 6,513,619 and US 2003-0151383A1 assume that the number of poles employed in the brushless motor is equal to the number of poles employed in a resolver for detecting the rotational position of the motor. In this case, one period of an electric angle Ea (or resolver rotation angle) of 360 degrees is divided into eight regions, i. e., regions A0 to A7, each having an angle of 45 degrees as shown in FIG. 10A. When the electric angle exists in region R1 or R5, for example, the rotational direction of the brushless motor can be determined based on a relation between the magnitudes of U-phase and V-phase currents (Iu and Iv) flowing through the motor.

In some cases, however, the number of poles employed in the brushless motor may not be equal to the number of poles employed in the resolver for detecting the rotational position of the motor. It is here assumed that the number of poles employed in the brushless motor is 14 while the number of poles in the resolver is two. In this case, in one period of the electric angle of the resolver, seven periods of each phase current of the brushless motor exist as shown in FIG. 10B. Thus, when the electric angle exists in region A1 or A5, the magnitude relation between the U-phase and V-phase currents of the motor is indeterminate, so that the rotational direction of the brushless motor cannot be determined. As a result, the operation to monitor a failure of the CPU cannot be carried out.

SUMMARY OF THE INVENTION

It is thus an object of the present invention to provide a vehicle with an electric power steering system capable of detecting a failure of a CPU with a simple circuit configuration even if the number of poles in a brushless motor is not equal to the number of poles in a resolver for detecting the rotational position of the motor.

According to the present invention, an electric power steering system comprises a three-phase brushless DC motor, a steering torque detector, a resolver and a processing unit for driving the three-phase brushless DC motor. The processing unit converts the resolver rotation angle into a motor rotation angle corresponding to the number of poles employed in the three-phase brushless DC motor, and computes a rotational direction command value of the three-phase brushless DC motor. The electric power steering system further comprises a failure detection apparatus connected to the processing unit to be capable of communicating with the processing unit. The failure detection apparatus determines whether a computation carried out by the processing unit is normal based on the motor rotation angle and the rotational direction command value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
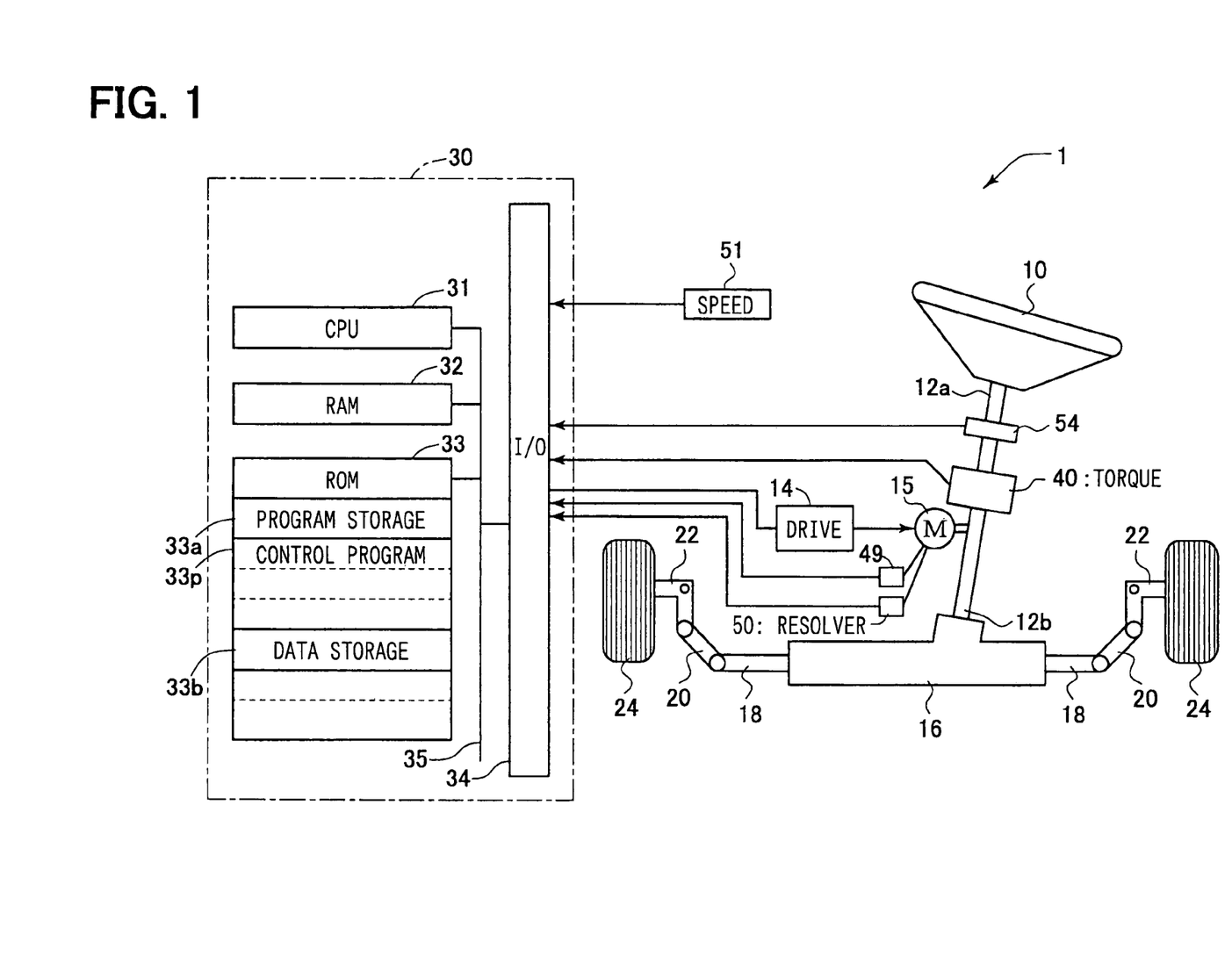
FIG. 1 is a block diagram showing an electric power steering system according to the present invention.

As shown in FIG. 1, in an electric power steering system 1, a steering wheel 10 is connected to a steering shaft 12a. The lower end of the steering shaft 12a is connected to a torque sensor 40. The upper end of a pinion shaft 12b is connected to the torque sensor 40. On the lower end of the pinion shaft 12b, a pinion not shown in the figure is provided. In a steering gear box 16, this pinion is engaged with a rack bar 18. One end of a tie rod 20 is connected to one end of the rack bar 18. The other end of the tie rod 20 is connected to a tire wheel 24 through a knuckle arm 22. Similarly, one end of another tie rod 20 is connected to the other end of the rack bar 18. The other end of the other tie rod 20 is connected to another tire wheel 24 through another knuckle arm 22. In addition, on the pinion shaft 12b, a three-phase brushless DC motor 15 is installed to serve as a power assist motor.

The torque sensor 40 for detecting the rotation of the steering wheel 10 gripped by the driver is used as a steering torque detection means. The torque sensor 40 is typically the generally known torsion bar or resolver. When the steering shaft 12a is rotated, a torque corresponding to the rotation quantity is detected and the detected information is supplied to a steering control unit 30.

The steering control unit 30 comprises a commonly known CPU 31 serving as a processing unit, a RAM 32, a ROM 33, an I/O unit 34 serving as an input/output interface, and a bus line 35 for connecting the CPU 31, the RAM 32, the ROM 33 and the I/O unit 34 to each other. The CPU 31 executes control by execution of programs and use of data. The programs and the data are stored in the RAM 32 and the ROM 33. The ROM 33 includes a program storage region R33a and a data storage region R33b. In the program storage region R33a, a steering control program 33p is stored. The data storage region R33b is used for storing data required for the operation of the steering control program 33p.

A resolver 50 is a kind of rotation transmission. The resolver 50 comprises two stator windings and one rotor winding. The two stator windings mechanically form an angle of 90 degrees. The amplitude of a signal obtained by magnetic coupling with the stator winding is a function of relative position. The relative position is the position of the rotor (the axis) relative to the stator. Thus, the resolver 50 generates two different output signals, i. e., a sin output signal and a cos output signal, which are obtained as results of modulating an input exciting signal by using sine and cosine components of an axial angle. The sine and cosine components of the axial angle are respectively the sinusoidal and cosine waves of the axial angle.

The resolver 50 is also connected to a speed sensor 51 for measuring the speed of the vehicle. A detected speed of the vehicle is supplied to the steering control unit 30.

Figure 2:
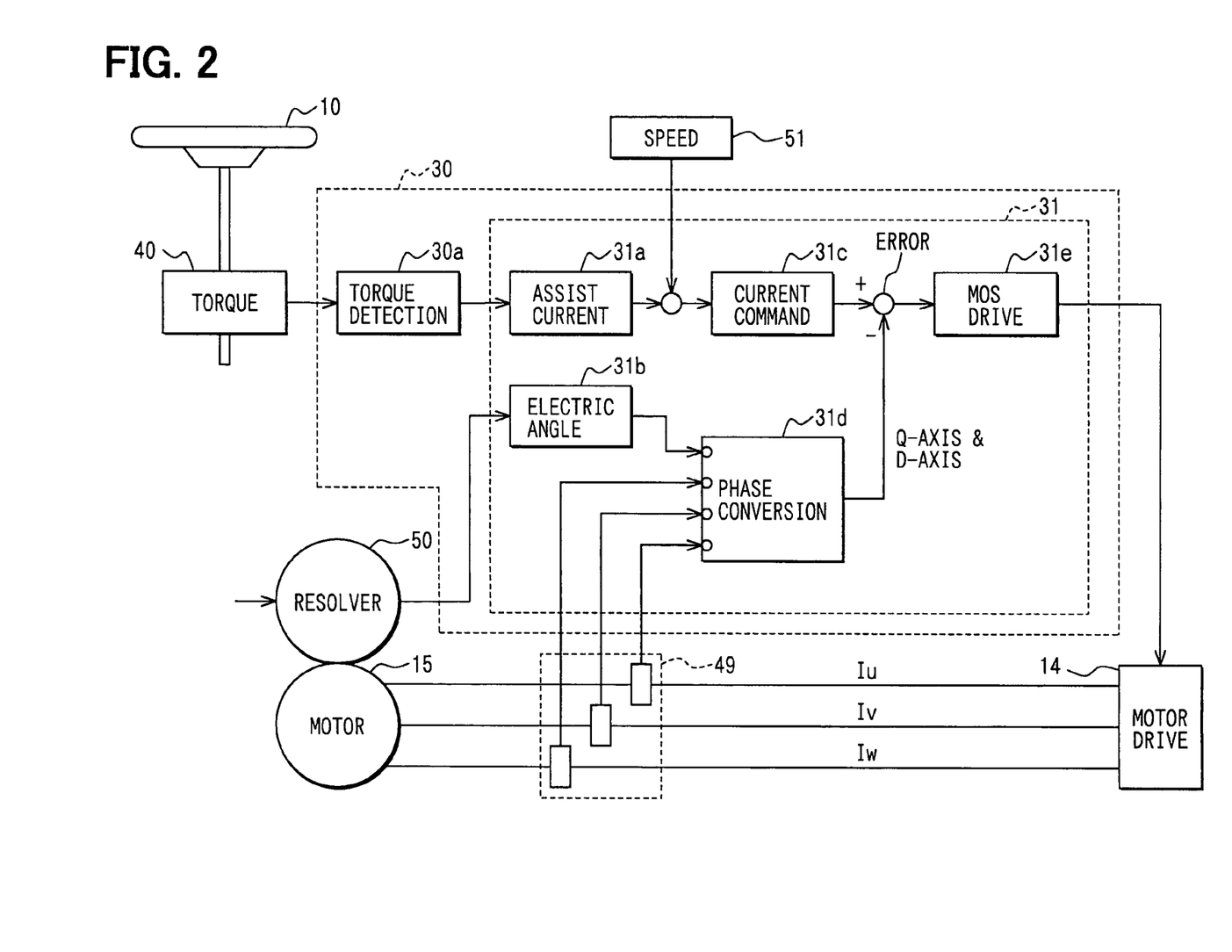
FIG. 2 is a block diagram for a motor control in the system shown in FIG. 1.

As shown in FIG. 2, the CPU 31 in the steering control unit 30 executes the steering control program stored in the ROM 33. By execution of this program, a steering torque detection circuit 30a finds the value of a steering torque based on a signal received from the torque sensor 40 provided on the steering shaft. Based on the value of the steering torque, an assist-current computation unit 31a of the CPU 31 computes an assist current for driving a three-phase brushless DC motor 15. The assist current and the vehicle-speed signal generated by the speed sensor 51 are supplied to a motor current command value computation unit 31c of the CPU 31 and used for calculating a motor current command value.

An error between the motor current command value and an actual current value is found. Detected by a current sensor 49, the actual current value is the magnitude of a current actually flowing through the three-phase brushless DC motor 15. The error is supplied to a MOS drive computation unit 31e for executing current feedback control to reduce this error to a zero. That is, the MOS drive computation unit 31e drives a motor drive circuit 14, which comprises a switching device such as an inverter, so as to make the three-phase brushless DC motor 15 generate an optimum assist torque.

In addition, in the current feedback control for driving the resolver 50, vector control is executed. In the vector control, the rotation angle θ of the resolver 50 is detected based on two different signals output by the resolver 50. The magnitudes of currents Iu, Iv and Iw of U, V, and W phases are detected by the current sensor 49. The magnitudes of the currents and the rotation angle θ of the resolver 50 are supplied to a 3-phase/2-phase conversion unit 31d of the CPU 31 to be converted into magnitudes of currents of two phases, i.e., q and d axes. The vector control is widely known.

Figure 3:
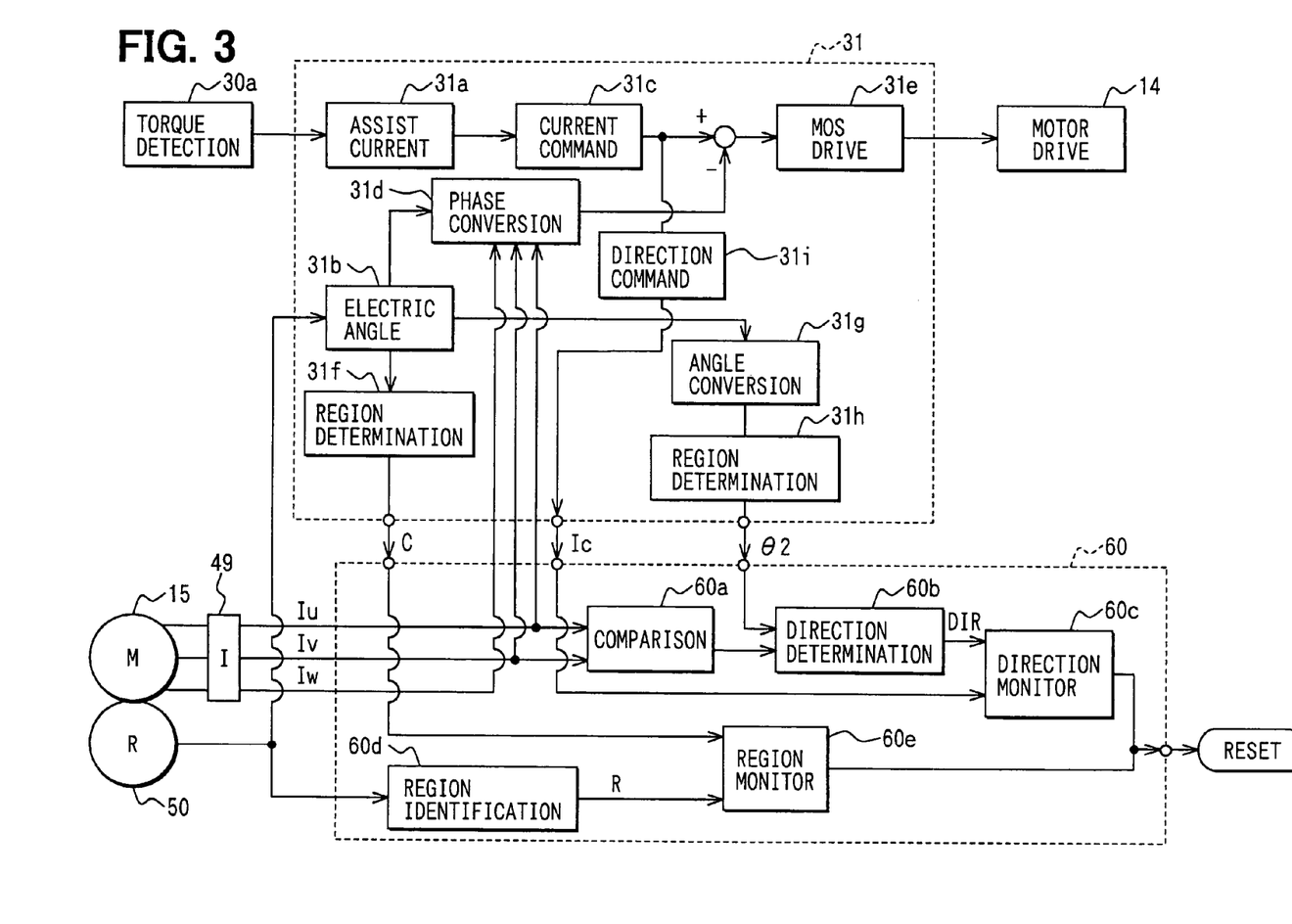
FIG. 3 is a block diagram for a failure determination in the system shown in FIG. 1.

By referring to a block diagram of FIG. 3 and flowcharts shown in FIGS. 4 to 7, the processing failure detection is described assuming that the steering control program 33p is being executed by the CPU 31 in the steering control unit 30.

In the block diagram of FIG. 3, a failure detection apparatus 60 is provided independently of the CPU 31 but connected to the CPU 31 so that data can be exchanged between the failure detection apparatus 60 and the CPU 31. Like the steering control unit 30, the failure detection apparatus 60 typically comprises a commonly known microcomputer and its peripheral circuits also generally known. However, the failure detection apparatus 60 can also have a configuration comprising dedicated hardware logic and a digital signal processor.

It is to be noted that the failure detection apparatus 60 carries out this processing repeatedly during execution of the steering control program 33p in the operation of the electric power steering system 1.

(First Failure Determination)

Figure 4:
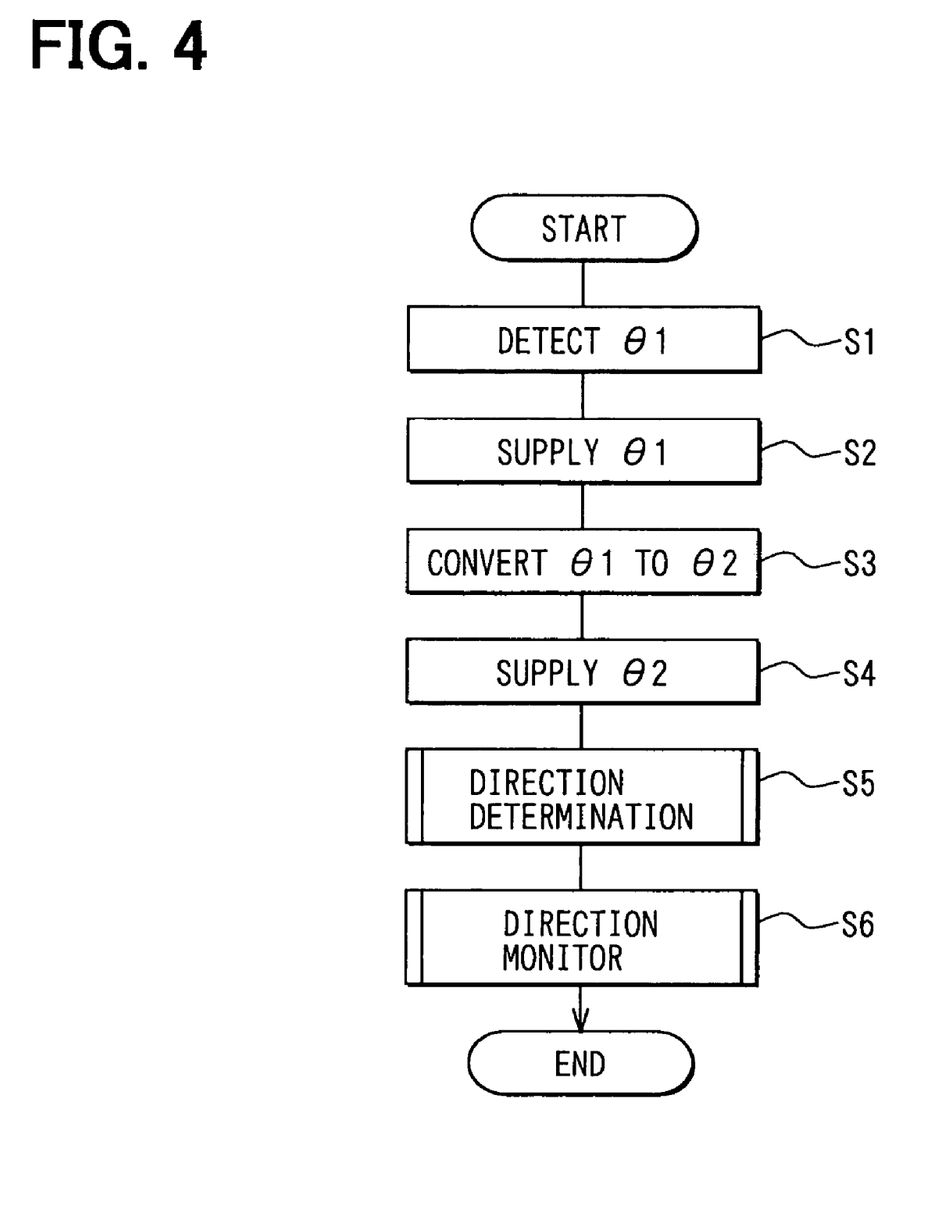
FIG. 4 is a flowchart for a first failure determination.

In FIG. 4, at step S1, an electric angle computation unit 31b of the CPU 31 finds an electric angle based on a signal output by the resolver 50. Then, at step S2, an electric angle θ1 found by the electric angle computation unit 31b is supplied to the failure detection apparatus 60. Subsequently, at step S3, an electric angle conversion unit 31g of the CPU 31 converts the electric angle θ1 into an electric angle θ2 agreeing with the number of poles in the three-phase brushless DC motor 15. That is, the CPU 31 converts the electric angle θ1 into such an electric angle θ2 that one period of the electric angle θ2 matches one period of each phase current flowing through the three-phase brushless DC motor 15. Then, at step S4, the electric angle θ2 is supplied to the failure detection apparatus 60.

Subsequently, at step S5, a U-V magnitude comparison unit 60a in the failure detection apparatus 60 compares the magnitude of the U-phase current Iu with the magnitude of the V-phase current Iv. The magnitude of the U-phase current Iu and the magnitude of the V-phase current Iv are obtained from the current sensor 49. On the other hand, a driving direction determination unit 60b in the failure detection apparatus 60 computes and determines a driving direction DIR of the three-phase brushless DC motor 15 based on a result of the comparison of the magnitude of the U-phase current Iu with the magnitude of the V-phase current Iv and the electric angle θ2 received from the CPU 31. The driving direction determination unit 60b is used as a first rotational direction computation means.

Finally, at step S6, a driving direction monitor unit 60c in the failure detection apparatus 60 receives a rotational direction command value computed by a rotational direction command value computation unit 31i based on the motor current command value of the computation unit 31c of the CPU 31 and determines whether or not the driving direction of the three-phase brushless DC motor 15 is correct based on the driving direction DIR of the three-phase brushless DC motor 15 and the motor current command Ic.

Figure 5:
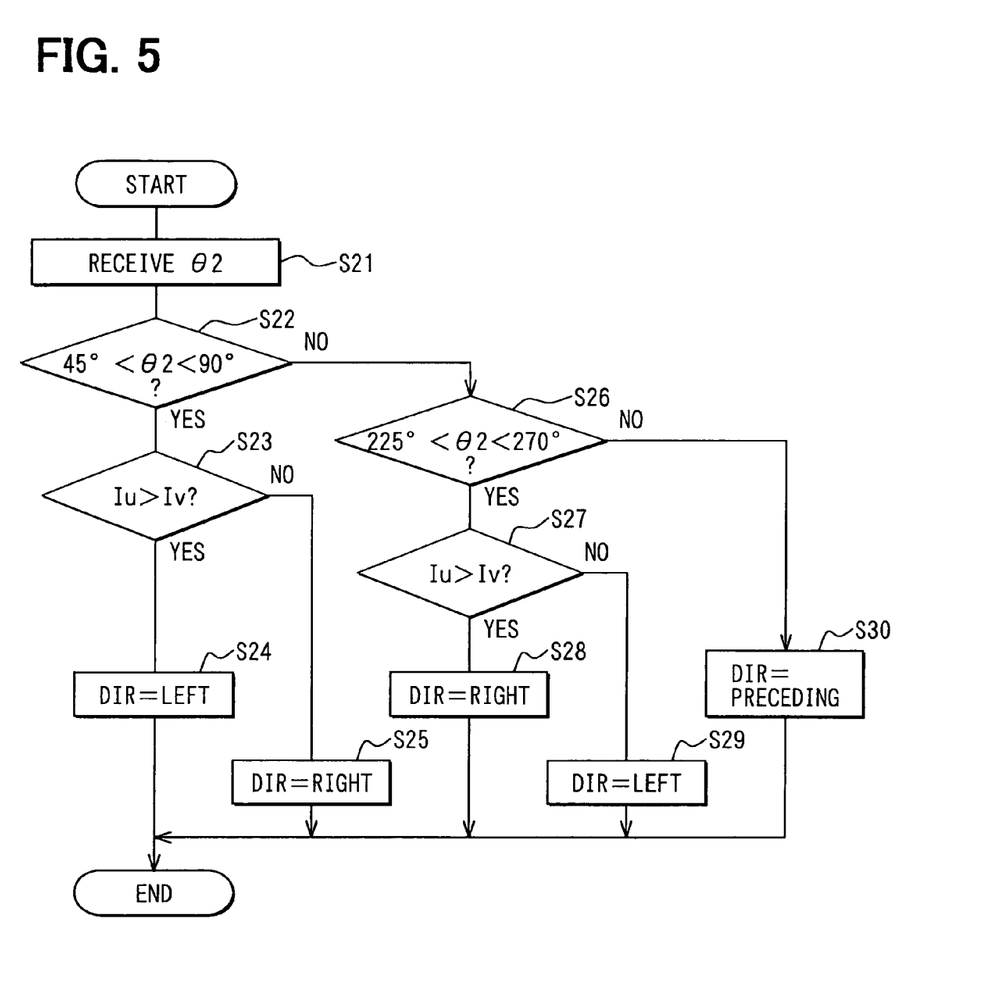
FIG. 5 is a flowchart for a driving direction determination.

As shown in the flowchart shown in FIG. 5, the driving direction determination unit 60*b* carries out processing to determine the driving direction of the three-phase brushless DC motor 15. This processing corresponds to Step S5 of the flowchart shown in FIG. 4.

First of all, at step S21, the electric angle $\theta2$ is received from the CPU 31. Then, at step S22, the electric angle $\theta2$ is examined to determine whether or not the electric angle $\theta2$ is in the region 45 degrees<$\theta2$<90 degrees. If the electric angle $\theta2$ is in the region, that is, if the determination result is YES, the processing moves to Step S23, at which the magnitudes of the U-phase current and the V-phase current are input from the current sensor 49 and compared with each other.

If the magnitude of the U-phase current Iu is found greater than the magnitude of the V-phase current Iv, that is, if the determination result produced at step S23 is YES, the driving direction of the three-phase brushless DC motor 15 is determined to be the direction to the left. In this case, the processing moves to Step S24.

If the magnitude of the U-phase current Iu is found smaller than the magnitude of the V-phase current, that is, if the determination result produced at step S23 is NO, on the other hand, the driving direction of the three-phase brushless DC motor 15 is determined to be the direction to the right. In this case, the processing moves to Step S25.

If the electric angle $\theta2$ is in the region 225 degrees<$\theta2$<270 degrees, that is, if the determination result produced at step S22 is NO and the determination result produced at step S26 is YES, the processing moves to Step S27 at which the magnitudes of the U-phase current Iu and the V-phase current Iv are input from the current sensor 49 and compared with each other.

If the magnitude of the U-phase current Iu is found greater than the magnitude of the V-phase current Iv, that is, if the determination result produced at step S27 is YES, the driving direction DIR of the three-phase brushless DC motor 15 is determined to be the direction to the right. In this case, the processing moves to Step S28. If the magnitude of the U-phase current Iu is found smaller than the magnitude of the V-phase current Iv, that is, if the determination result produced at step S27 is NO, on the other hand, the driving direction DIR of the three-phase brushless DC motor 15 is determined to be the direction to the left. In this case, the processing moves to Step S29.

It is to be noted that if the electric angle $\theta2$ is neither in the region 45 degrees<$\theta2$<90 degrees nor in the region 225 degrees<$\theta2$<270 degrees, that is, if the determination result produced at step S26 is NO, the processing moves to Step S30. At this step, the driving direction DIR of the three-phase brushless DC motor 15 is not updated and kept at the value found in the preceding processing to determine the driving direction DIR of the three-phase brushless DC motor 15.

In the processing represented by the flowchart shown in FIG. 5, the driving direction determination unit 60*b* uses the electric angle $\theta2$ received from the CPU 31 as it is. However, it is also possible to adopt a method, whereby an electric angle region determination unit 31*h* of the CPU 31 finds an electric angle region to which the electric angle $\theta2$ pertains and the electric angle region is used by the driving direction determination unit 60*b*. In this case, processing to find an electric angle region may be included in Step S4 of the flowchart shown in FIG. 4.

That is, if the electric angle $\theta2$ is in the region 45 degrees<$\theta2$<90 degrees, the electric angle region determination unit 31*h* determines that the electric angle $\theta2$ pertains to region R1 as shown in FIG. 10A. If the electric angle $\theta2$ is in the region 225 degrees<$\theta2$<270 degrees, on the other hand, the electric angle region determination unit 31*h* determines that the electric angle $\theta2$ pertains to region R5 as shown in FIG. 10A. If the electric angle $\theta2$ does not pertain to region R1 or region R5, the immediately preceding result of determination is used as it is. Then, this determination result indicating a region is supplied to the failure detection apparatus 60.

The driving direction determination unit 60*b* in the failure detection apparatus 60 determines the driving direction based on the region information received from the CPU 31 in the processing for determining the driving direction represented by the flowchart shown in FIG. 5. That is, at step S22, the region information is examined to determine whether or not the region information is region R1. At step S26, on the other hand, the region information is examined to determine whether or not the region information is region 5.

Figure 6:
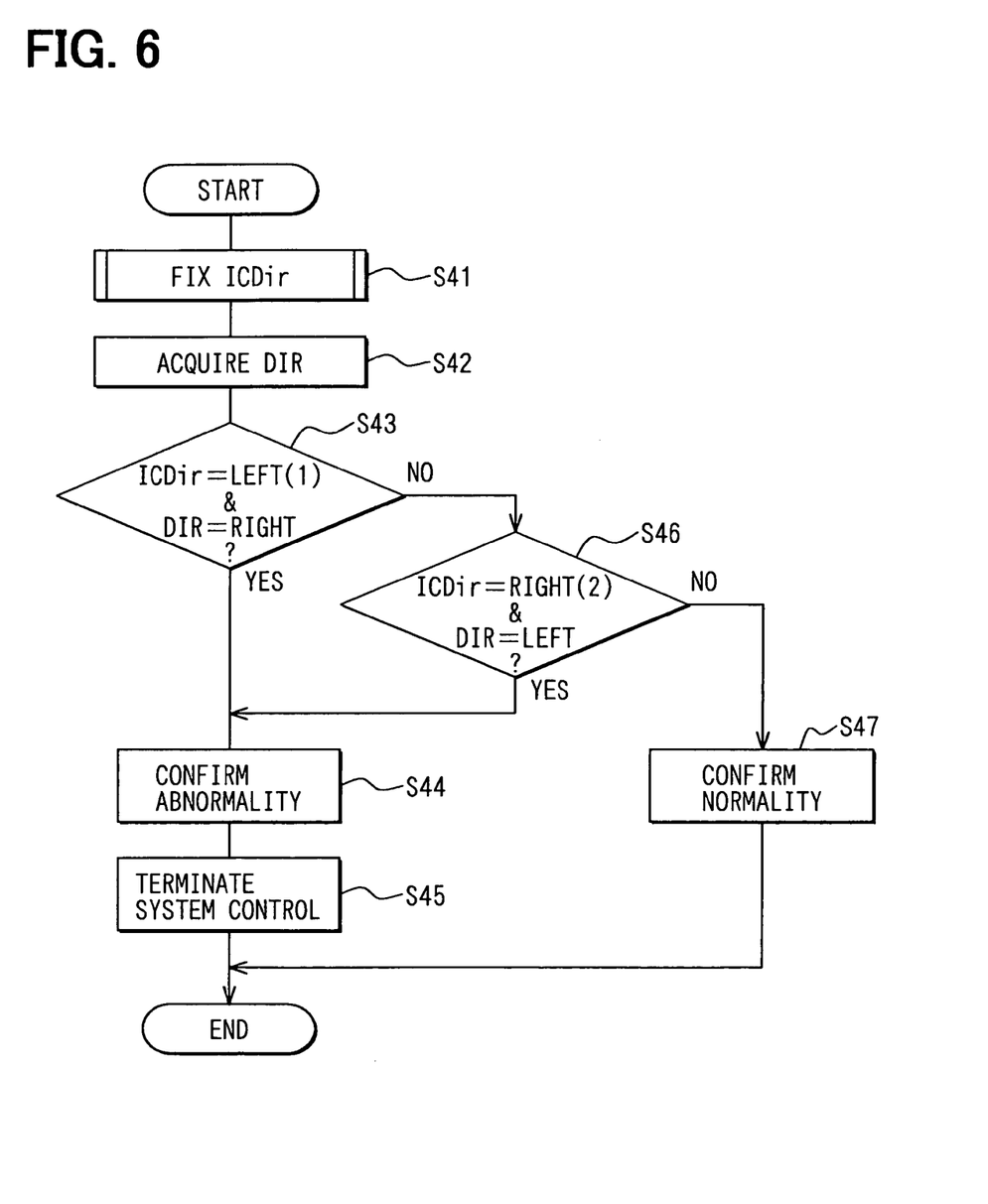
FIG. 6 is a flowchart for a driving direction monitoring.

Next, processing carried out by the driving direction monitor unit 60*c* to monitor the driving direction of the three-phase brushless DC motor 15 is explained by referring to the flowchart shown in FIG. 6. This processing corresponds to Step S6 of the flowchart shown in FIG. 4. First, at step S41, a driving command direction ICDir is fixed from a motor current command Ic received from the CPU 31. Then, at step S42, the motor driving direction DIR detected by the driving direction determination unit 60*b* is acquired.

The driving command direction ICDir and the motor driving direction DIR are used for determining the existence of a failure. Specifically, if the driving command direction ICDir is a direction to the left while the motor driving direction DIR is a direction to the right, that is, if the determination result produced at step S43 is YES and, if the driving command direction ICDir is a direction to the right while the motor driving direction DIR is a direction to the left, that is, if the determination result produced at step S43 is NO but a determination result produced at step S46 is YES, the existence of an abnormality is confirmed at step S44. This is because the actual driving direction of the three-phase brushless DC motor 15 is different from the driving command direction given to the three-phase brushless DC motor 15. Then, at step S45, abnormality-handling processing such as processing to terminate the electric power steering system control is performed.

If the driving command direction ICDir and the motor driving direction DIR are both a direction to the left or a direction to the right, that is, if the determination results produced at step S43 and Step S46 are both NO, on the other hand, normality (no abnormality) is confirmed to exist at step S47. This is because the actual driving direction of the three-phase brushless DC motor 15 agrees with the driving command direction given to the three-phase brushless DC motor 15.

Figure 7:
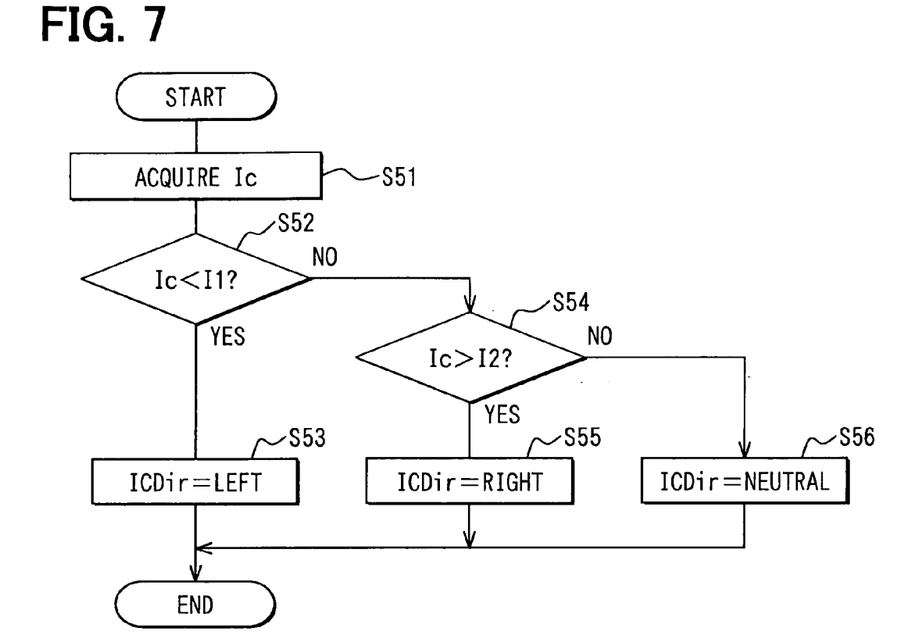
FIG. 7 shows a flowchart for a drive command direction determination from a current command value.

Next, processing carried out by the driving direction monitor unit 60*c* to confirm the driving command direction ICDir is explained by referring to the flowchart shown in FIG. 7. This processing corresponds to Step S41 of the flowchart shown in FIG. 6. First of all, at step S51, the motor current command Ic is received from the CPU 31. If the motor current command Ic is smaller than a predetermined value I1, that is, if the determination result produced at step S52 is YES, the driving command direction ICDir is determined to be a direction to the left at step S53.

If the motor current command Ic is greater than the predetermined value I1 and another predetermined value I2, that is, if the determination result produced at step S52 is NO while the determination result produced at step S52 is YES, the driving command direction ICDir is determined to be a direction to the right at step S55. If the motor current command Ic is greater than the predetermined value I1 but smaller than the other predetermined value I2, that is, if the determination results produced at steps 52 and 54 are both NO, at step S55, the driving command direction ICDir is determined to be a neutral direction, which is neither the direction to the right nor the direction to the left.

(Second Failure Detection)

Figure 8:
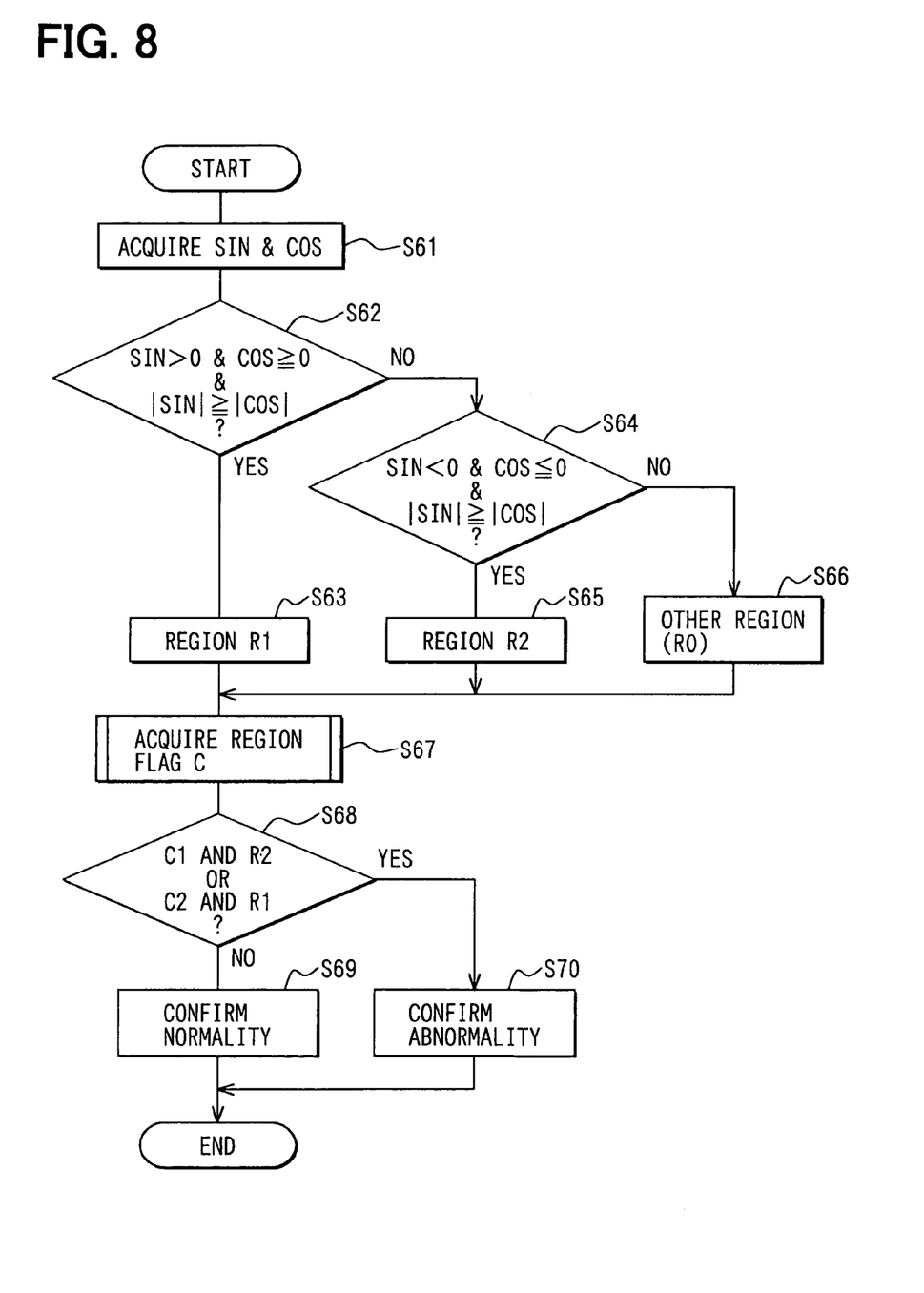
FIG. 8 is a flowchart for a second failure determination by comparison of rotational regions.
Figure 9:
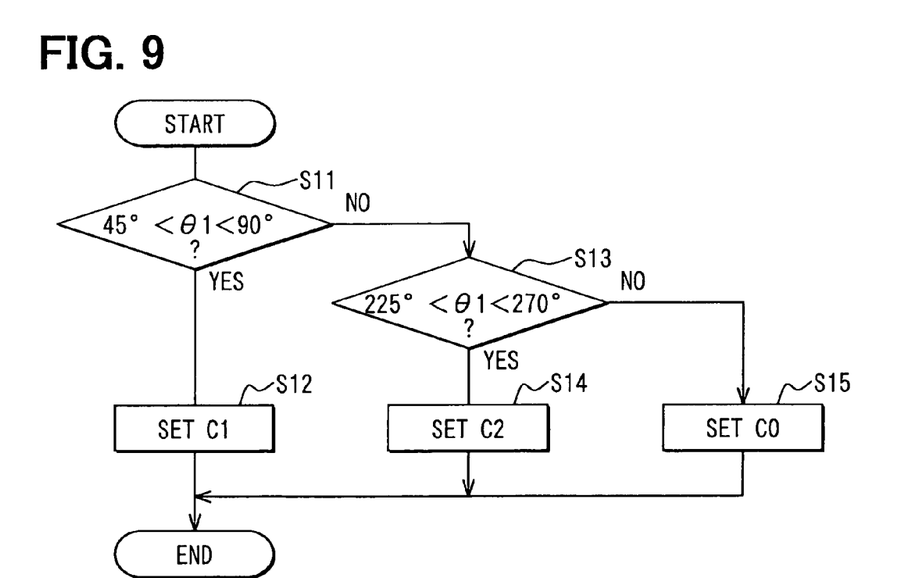
FIG. 9 is a flowchart for a rotational region finding from an electric angle.

By referring to the flowchart shown in FIG. 4 and other flowcharts shown in FIGS. 8 and 9, second failure detection processing is described. At step S61 of the flowchart shown in FIG. 8, an electric angle region identification unit 60d in the failure detection apparatus 60 acquires a sine output signal (SIN) and a cosine output signal (COS) from the resolver 50. The electric angle region identification unit 60d corresponds to a second resolver rotation angle region determination means.

If the sine output signal is greater than 0, the cosine output signal is at least equal to 0 and the absolute value of the sine output signal is at least equal to the absolute value of the cosine output signal, that is, if the determination result produced at step S62 is YES, the rotational position of the three-phase brushless DC motor 15 is determined to be in region R1 shown in FIG. 10A and a region flag R is set at 1 at step S63.

If the sine output signal is smaller than 0, the cosine output signal is not greater than 0, and the absolute value of the sine output signal is at least equal to the absolute value of the cosine output signal, that is, if the determination result produced at step S62 is NO but the determination result produced at step S64 is YES, the rotational position of the three-phase brushless DC motor 15 is determined to be in region R5 shown in FIG. 10A and the region flag R is set at 2 at step S65.

If the rotational position of the three-phase brushless DC motor 15 is determined to be in neither region R1 nor region R5 shown in FIG. 10A, that is, if the determination results produced at steps 62 and 64 are both NO, the region flag R is set at 0 at step S65.

The value of the region flag R set as described above is supplied to an electric angle region monitor unit 60e in the failure detection apparatus 60.

At step S67, the electric angle region monitor unit 60e receives the region flag C found by an electric angle region determination section 31f of the CPU 31. The electric angle region determination section 31f corresponds to a first resolver rotation angle region determination means. A method adopted by the electric angle region determination section 31f to set the region flag C will be described later.

Then, at step S68, the region flag R is compared with the region flag C. If the region flag R is equal to the region flag C, that is, if the determination result produced at step S68 is NO, a normality is confirmed and processing of the electric power steering system 1 in a normal state is carried out at step S69 because the region-determination result produced by the CPU 31 is the same as a region-determination result produced by the failure detection apparatus 60.

If the region flag R is not equal to the region flag C, that is, if the determination result produced at step S68 is YES, on the other hand, existence of a failure is determined to have occurred in either the CPU 31 or the failure detection apparatus 60 or both. An abnormality-handling processing such as processing to terminate the electric power steering system control is carried out at step S70. This is because a region-determination result produced by the CPU 31 is different from a region-determination result produced by the failure detection apparatus 60.

Finally, both the determination result produced by the electric angle region monitor unit 60e and the determination result produced by the driving direction monitor unit 60c are taken into consideration. If either the determination result produced by the electric angle region monitor unit 60e or the determination result produced by the driving direction monitor unit 60c indicates existence of an abnormality, abnormality-handling processing such as processing to terminate the electric power steering system control is carried out.

Next, by referring to the flowchart shown in FIG. 9, processing to confirm the region flag C found by the electric angle region determination section 31f of the CPU 31 is explained. This processing corresponds to part of Step S67 of the flowchart shown in FIG. 8. The electric angle region determination section 31f receives the value of the electric angle $\theta 1$ from the electric angle computation unit 31b and finds the region to which the electric angle $\theta 1$ pertains. Specifically, if the electric angle $\theta 1$ is in the region 45 degrees<$\theta 1$<90 degrees, that is, if the determination result produced at step S11 is YES, the rotational position of the three-phase brushless DC motor 15 is determined to be in the region R1 as shown in FIG. 10A. In this case, at step S12, the region flag C is set at C1. If the electric angle $\theta 1$ is in the region 225 degrees<$\theta 1$<270 degrees, that is, if the determination result produced at step S11 is NO but the determination result produced at step S13 is YES, the rotational position of the three-phase brushless DC motor 15 is determined to be in the region R5 as shown in FIG. 10A. In this case, at step S14, the region flag C is set at C2. If the rotational position of the three-phase brushless DC motor 15 is determined to be neither in region R1 nor in region R5, that is, if the determination results produced at steps 11 and 13 are both NO, the region flag C is set at C0 at step S15.

The above embodiments are merely typical implementations of the present invention and the present invention is thus not limited to the embodiments.

What is claimed is:

1. An electric power steering system comprising:
   a three-phase brushless DC motor;
   a steering torque detection means for detecting a steering torque generated on a steering shaft; and
   a resolver for detecting a resolver rotation angle of the brushless DC motor,
characterized by
   a rotation angle conversion means for converting the resolver rotation angle into a motor rotation angle corresponding to the number of poles employed in the brushless DC motor;
   a rotational direction command value computation means for computing a rotational direction command value of the brushless DC motor;
   a command current value computation means for computing a command current value for driving the brushless DC motor;
   a MOS driving computation means for driving the brushless DC motor based on the command current value;

a failure detection apparatus connected to be capable of communicating with the command current value computation means for determining whether a computation carried out by the command current value computation means is normal, wherein the failure detection apparatus determines whether a computation operation is normal based on the motor rotation angle and the rotational direction command value.

2. An electric power steering system according to claim 1, further comprising:

a current detection means for detecting currents of at least two phases among sinusoidal currents of three phases flowing through the brushless DC motor; and a 3-phase/2-phase conversion means for computing a detection current for driving the brushless DC motor based on the currents of at least two phases;

wherein the command current values computation means computes the command current value based on the steering torque and the detection current.

3. An electric power steering system according to claim 2, wherein the failure detection apparatus has:

a phase current comparison means for comparing magnitudes of the currents of the two phases with each other;

a first rotational direction computation means for computing a rotational direction of the brushless DC motor based on the motor rotation angle and a comparison result produced by the phase current comparison means; and a direction monitor means for comparing the rotational direction command value with a computation result produced by the first rotational direction computation means to determine whether the MOS drive computation means is normal.

4. An electric power steering system according to claim 3, further comprising:

a motor rotation angle region determination means for finding an angle region including the motor rotation angle, wherein the failure detection apparatus has a second rotational direction computation means for finding a rotational direction of the brushless DC motor based on the angle region determined by the determination means as well as a comparison result produced by the current comparison means, and wherein the failure detection apparatus compares the rotational direction command value with a computation result produced by the second rotational direction computation means to determine whether the computation operation is normal.

5. An electric power steering system according to claim 1, further comprising:

a first resolver rotation angle region determination means for finding an angle region including the resolver rotation angle, wherein the failure detection apparatus has a second resolver rotation angle region determination means for finding an angle region including the resolver rotation angle and determines whether the angle region found by the first resolver rotation angle region determination means matches the angle region found by the second resolver rotation angle region determination means to determine whether the computation operation is normal.

6. An electric power steering system according to claim 5, wherein the failure detection apparatus compares the rotational direction command value with a computation result produced by the rotational direction computation means and determines whether the angle region found by the first resolver rotation angle region determination means matches the angle region found by the second resolver rotation angle region determination means to determine whether the computation operation is normal.

* * * * *